Feb. 10, 1970   R. C. PRUSINSKI ET AL   3,494,086
PANEL CONSTRUCTION AND THE METHOD OF MAKING THE SAME
Filed April 22, 1968

INVENTORS
RICHARD C. PRUSINSKI
ATTILIO TORCOLACCI
MARCEL FERMANI
LUIGI FERMANI
BY *Whittemore, Hulbert & Belknap*
ATTORNEYS

United States Patent Office

3,494,086
Patented Feb. 10, 1970

3,494,086
PANEL CONSTRUCTION AND THE METHOD OF MAKING THE SAME
Richard C. Prusinski, Dearborn, and Attilio Torcolacci, Marcel Fermani, and Luigi Fermani, Detroit, Mich., assignors to Architectural Research Corp., Detroit, Mich., a corporation of Michigan
Filed Apr. 22, 1968, Ser. No. 723,032
Int. Cl. E04c 2/20, 2/54
U.S. Cl. 52—306                    9 Claims

ABSTRACT OF THE DISCLOSURE

A laminated structural panel for forming a portion of a building wall is provided. The panel comprises at least two, preferably three, matrix layers of a filled resinous material. A foraminous sheet, preferably woven glass fiber, is provided at the interface of the adjacent layers. A mass of rigid foamed material is encased by said layers. The foamed material acts as an inexpensive fill, as insulation and as a panel lightener.

At least one, preferably a plurality, of translucent blocks, each having a thickness considerably less than the panel thickness, are provided in the panel. The blocks are completely surrounded by the matrix layers. The marginal peripheral edges of the blocks extend into the matrix layers a distance sufficient to form a firm mounting for the blocks. The matrix layers have opening means on each side of the blocks for transmission of light rays therethrough. A seal structure, preferably a flexible, resilient gasket, is provided around the entire outer peripheral edge of each of the blocks to provide a fluid-tight seal between the blocks and the matrix layers.

In the process of making the panel, the weight of the resinous material and the shrinkage of the resinous material during curing thereof causes the resinous material to apply a compressive force to the gasket. This compressive force insures that the seal will be fluid-tight even if at a later stage in the life of the panel the resinous material tends to separate slightly from the translucent blocks.

Background of the invention

We have disclosed, in our copending United States patent application, Ser. No. 522,552, filed Jan. 24, 1966, a panel construction of the general type presently disclosed. Such panels are designed as massive structural panels for forming a portion of a building wall. The panels may be classified as structural but non-load bearing.

The matrix material of the panels is a filled resin. The panels are basically designed to compete with precast concrete panels. The panels have numerous advantages over precast concrete, such as lower weight, lower manufacturing cost, lower installation cost and greater design flexibility. Additionally, the resinous panels are practically maintenance free and may be overlaid on the exterior surface area thereof with decorative mineral chips. It is difficult to provide such ornamental chips in a concrete panel because concrete has a tendency to have a poor bond with such chips.

There is a constant demand on the part of architects to provide such panels with new design effects. One desired type of panel is a panel which has light transmitting characteristics. That is, to have translucent blocks in the matrix of the panel to provide both a visually attractive appearance and to permit the transmission of light through the panel for an interior effect within the building.

One problem which arises in connection with the use of translucent blocks in such a panel is the sealing of the juncture of the blocks with the matrix material of the panel. The panels, being an integral portion of the building on which they are mounted, must be resistant to the ingress of weather such as wind, rain, moisture and the like. In accordance with the present invention, a desired panel structure is provided having translucent blocks imbedded therein and in which the juncture of the blocks and the matrix of the panel is fluid-tight.

Summary of the invention

The invention provides a structural panel of a plurality of adhering layers for forming a portion of a building wall. The panel comprises at least two matrix layers of filled resinous material. A foraminous sheet is provided at the interface of said layers. A mass of rigid foamed material is encased by said layers. At least one translucent block having a thickness considerably less than the panel thickness is completely surrounded by the matrix layers. The marginal peripheral edges of said block extend into the matrix layers a distance sufficient to form a firm mounting for the blocks. The matrix layers have opening means on each side of the block for transmission of light rays therethrough. A seal structure is provided around the entire outer peripheral edge of the blocks to result in a fluid-tight seal between the blocks and the matrix layers.

The method of making the panel construction comprises the steps of intermixing filler particles with a curable resinous material to form a dough-like mass. At least one translucent block is provided with a flexible, resilient gasket around the entire outer peripheral edge thereof. The block is encased in said resinous mass with the marginal peripheral edge of the block extending into the mass a distance sufficient to form a firm mounting for the block. Opening means are formed on each side of the block for transmission of light rays therethrough. Finally, the resinous material is cured to a solid state, placing the gasket under compression, to form a fluid-tight seal between the block and the resinous material.

In the drawing

Figure 1:
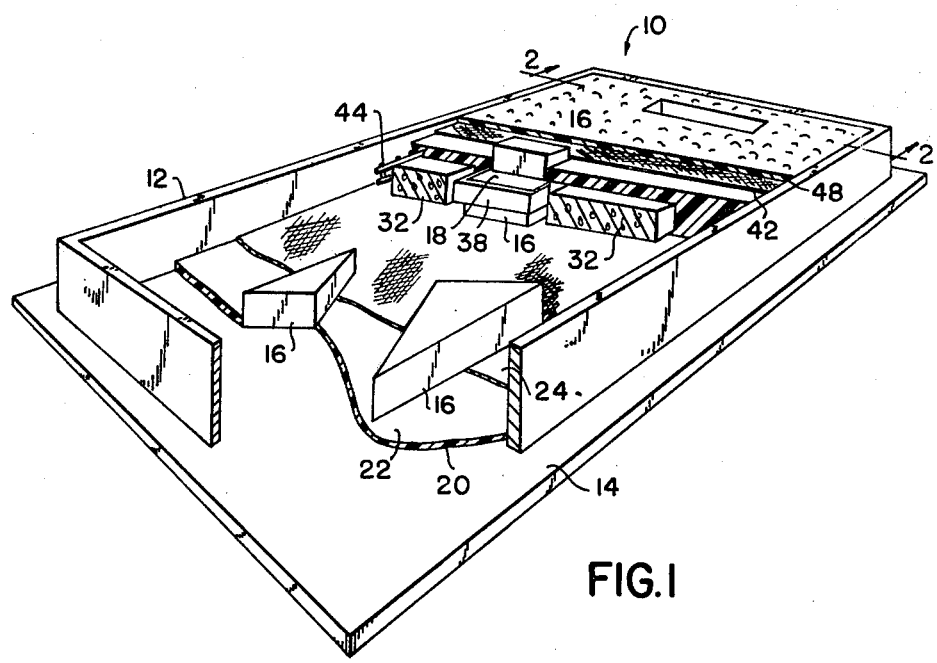
FIGURE 1 is a perspective view illustrating the construction and method of fabricating a panel construction embodying features of our invention with parts broken away for the purpose of clarity.

The basic panel construction of our invention is disclosed in our copending United States patent application, Ser. No. 522,552, filed Jan. 24, 1966. This basic construction is modified in accordance with the present invention by the use of blocks of glass as an integral portion of the panel construction.

Referring to the figures, it will be noted that the panel 10 is formed within a rectangular frame 12 which rests on the flat surface of a supporting structure 14. It will be appreciated that the shape of the panel may be modified from that shown to suit the particular needs of a building of which the panel is to form a wall section.

The first step in the formation of the panel 10 is to prepare a plurality of plugs 16. The plugs 16 are utilized during manufacture of the panel and are removed from the panel after completion thereof. The plugs serve to form recesses in the panel on either side of the glass blocks 18 to thereby locate the glass blocks centrally of the panel while still permitting the passage of light through the glass. The plugs 16 are preferably formed in the same shape as the glass blocks and may be triangular, rectangular, circular or the like. However, it is not necessary that the plugs be of the same shape as the glass in order to achieve the desired final visible glass shape because the plugs define the border around the glass. The marginal edge portions of the glass blocks are overlaid with the panel material and the only portion thereof which is visible is that which is in contact with the plugs. Therefore, the glass blocks may have any desired shape and need not be cut in the exact final exterior visible shape. The plug 16 may be fabricated of any suitable material. For example, the plugs may be wooden, solid plastic, foamed plastic or the like.

The plugs 16 are set on the flat surface of the supporting structure 14 in the position where it is desired to have the glass blocks 18. The glass blocks are, of course, arranged in a design or pattern which is visually attractive. After the plugs 16 have been set on the supporting structure 14, a first layer 20 of resinous material is laid on the supporting structure 14 around the plugs 16 to completely fill the space between the plugs and the frame 12. The resinous material has intermixed therein filler material, preferably in the amount of from sixty to ninety percent by volume, to form a dough-like mass. After the resinous material forming the layer 20 has been laid in, the upper surface 22 is smoothed by use of a trowel to form a continuous non-irregular surface. It is possible to have the entire panel, including the surface 22, curved. However, it is desired to eliminate all irregularities, such as protuberances and depressions in this surface.

A suitable resin for use in the invention may be a polyester resin. Polyester resins consist of the reaction product of a dibasic acid and dihydric alcohol dissolved in a polymerizable monomer. The dibasic acids used in the resin solution may be iso-phthalic acids, phthalic anhydride, adipic acid, tetra phthalic anhydride, maleic acid, fumaric acid or itaconic acid. The dihydric alcohols in the polyester resin solution may, for example, be any glycol such as ethylene glycol, propylene glycol, diethylene glycol, dipropylene glycol or 1–3 butylene glycol. The polymerizable monomer used in the polyester resin solution can, for example, be styrene, vinyl toluene, methyl methacrylate or diallyl phthalate.

Various filler materials can be intermixed in the resin, as for example, small mineral particles, asbestos fibers, perlite, ground chalk, finely ground wood chips and fiber glass wool. The filler may be combined with suitable pigments to provide a desired color in the finished panel.

The preferred filler material is small mineral particles. The particles may be, for example, sand, marble, granite or the like. Silica sand is preferred. The mineral particles serve two functions in addition to acting as an inexpensive fill. Firstly, they perform the usual function of reinforcing the resin to increase the overall strength of the panel. Secondly, and more importantly, the particles give the exterior surface of the panel a texture similar to that of concrete. The usual glassy appearance of a resin is considered objectionable in many applications, the texture of concrete being preferred. The desired texture is achieved as the result of the particles which are at or near the outer surface of the panel.

By the intermixing of sixty to ninety percent filler material by volume, preferably eighty percent, with the resinous material, a dough-like mass is provided which may be worked and smoothed by hand with the use of a trowel similar to the manner of applying plaster or cement. Additionally, vibration techniques may be employed for applying the resin. With the high percentage of filler used, there is an equalization of stresses when the plastic cures and the surface remains smooth and the layer formed thereby retains its strength.

After the layer 20 is formed and before it completely cures, a sheet 24 of wire screen, woven glass fiber, glass fiber mat, or other foraminous material is laid on the upper surface 22 of layer 20 to completely overlie the plastic mass. Preferably, the sheet 24 is fabricated of woven glass fiber. Openings 26 are cut in the sheet 24 to fit over the plugs 16. After the sheet 24 is laid in place it is smoothed out so that there are no wrinkles or bubbles. Such wrinkles or bubbles would tend to cause delamination of the layers and reduce the overall strength of the panel construction.

Another layer 28 of the same dough-like mass is placed on the sheet 20 to the level of the dotted line 30. Portions of the layers 20, 28 penetrate the sheet 24 and combine to cause adherence of the two layers. After the layer 28 is completed, blocks of rigid foam material 32 are placed on the upper surface thereof. The blocks 32 cover a major area of the surface although not the entire surface area. The blocks 32 may be individual pieces placed in side-by-side relationship as shown. Alternately, a single large block may be used with the appropriate openings cut in for the glass blocks 18. Another layer 34 of the dough-like plastic mass is then laid on the layer 28 to the level represented by the dotted line 36.

The glass blocks 18 are then set on the upper surface of the layer 34 in the appropriate location. It will be noted that the glass blocks 18 are arranged so that the marginal edge portions thereof extend beyond the periphery of the plugs 16. The glass blocks 18, referred to in the trade as "dalles," are relatively thick pieces of glass and are fabricated of impact resistant glass material to thereby function as a structural portion of the panel. The thickness of the glass may vary widely depending upon the ultimate use of the panel. However, sizes in the range of from ¼ to ⅞″ thick appear to be most suitable for the invention. Translucent materials other than glass may be used. For example, plastic materials such as compositions of methyl methacrylate may be used.

A rubber gasket 38 is placed entirely around the periphery of each glass block 18. The function of the gasket 38 is to provide a fluid tight seal between the glass section and the material of the panel. The gasket 18 may be fabricated of any suitable resilient flexible material such as the rubber material shown or a solid resinous material. Theoretically, a viscous flowable material may be used in accordance with the invention. However, such material possesses the disadvantage that it will not compress under pressure to form a tight seal as will a solid rubber or resinous gasket material. One of the advantages of initial compression of the gasket material is that in the event of ultimate shrinkage or other movement of the material of the panel away from the glass, a precompressed material will tend to expand and maintain the desired fluid-tight seal.

Figure 2:
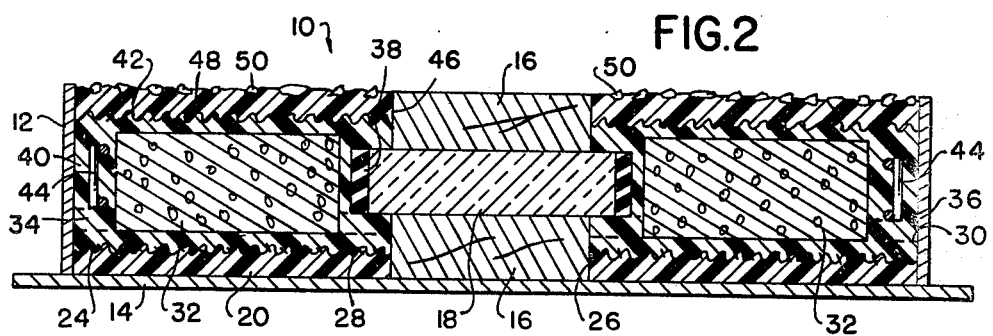
FIGURE 2 is a view in section taken along the line 2—2 of FIGURE 1 looking in the direction of the arrows.
Figure 3:
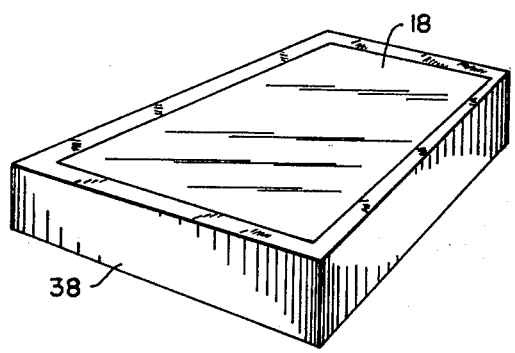
FIGURE 3 is a view in perspective of a glass block with a gasket mounted thereon which is utilized in the panel construction illustrated in FIGURES 1 and 2.

After the glass blocks 18 have been set in place, the upper plugs 16 are set atop the glass blocks and another layer 40 of the same dough-like plastic mass is placed upon the layer 34. The layer 40 extends up to the level defined by the second sheet 42 of foraminous material. A reinforcing steel structure 44 of ladder-like construction is placed on all sides of the blocks 32, as shown in FIGURES 1 and 2. This reinforcing structure is normally used only in large panels. After the layer 40 is formed, the upper surface thereof is smoothed with a trowel as previously described in connection with the layer 20. The sheet 42 of foraminous material has opening means 46 to fit around the plugs 16. The sheet 42 is smoothed out so that there are no wrinkles or bubbles as previously described in connection with the sheet 24.

The three layers 28, 34, 40 tend to integrate one with the other and form what, in essence, is a single layer. There is, however, some definition between these layers even after the material has cured.

Various types of foamed materials may be used to fabricate the blocks 32. Foamed polyurethane or foamed glass or honeycomb are preferred materials. Foamed polyurethane is preferred for some applications in which high-heat insulation properties are desired. Foamed glass, which is a relatively strong material, is preferred when high panel strength is desired. Foamed material, in comparison with the resinous material forming the matrix is relatively inexpensive and lighter than an equal volume of resin. Therefore, the use of foamed material is desirable both from the cost standpoint and from the standpoint of the weight of the panel. A final layer 48 of the same dough-like mass of plastic as the previous layers is placed over the sheet 42 and adheres to the layer 40 in the same manner as described in connection with layers 20 and 28. Small, irregularly shaped stones or ceramic pieces 50 may then be imbedded on the exterior surface of the layer 48. The pieces 50 may be such as glass quartz, marble or granite. Additionally, internally threaded cylindrical inserts may be imbedded in layer 48 to receive bolts for mounting the finished panel. In that case, the bottom surface of the lower layer 20 would be used as the exterior panel surface. The bottom surface of layer 20 may be left smooth or it may be textured. In some cases, stones may be imbedded in the outer surface of layer 48 and the bottom surface of layer 20 may be textured to form a finished interior.

From the foregoing it will be appreciated that we have provided a durable and weatherproof multi-layer panel construction with each of the layers being adhered together. When a layer is placed on another layer, it becomes adhered thereto with the result that all of the layers are united. Also, foraminous sheet material is stretched between the middle layer structure and each of the outer layers and a mass of rigid foamed material is encased within the middle layer. Glass blocks are securely mounted within the panel structure, portions thereof being extended into the panel for firm and rigid mounting. The gasket around the glass sections results in a fluid-tight juncture between the glass sections and the panel per se.

When the panel is completed and cured, the frame 12, support 14 and plugs 16 are removed. The panel is then ready for installation.

The weight of the plastic matrix tends to compress the gaskets 38 around the glass blocks 18. This promotes a fluid-tight seal. Additionally, as the resinous material cures, some shrinkage occurs in the central portion of the panel where the glass blocks 18 are located. The shrinkage is inwardly toward the glass blocks. This shrinkage further insures the provision of a fluid-tight seal.

It will be noted that the final panel has three basic layers, the surfaces of which are substantially parallel and the abutting surfaces of which are substantially smooth. These relationships are important because they prevent uneven expansion or contraction between the layers thus forming a stress balanced sandwich structure which may be used as a structural, non-load bearing wall in a building. Such balancing is further enhanced in an important way by the provision of the various layers. The provision of a sheet of foraminous material between the outer layers and the central layer results in stress balancing and prevents bowing, cracking and crazing, cold-flow and warping and other undesirable factors leading to dimensional unstability and panel failure.

What we claim as our invention is:

1. A structural panel for forming a portion of a building wall comprising a matrix of filled resinous material, at least one translucent block having a thickness considerably less than the panel thickness completely surrounded by the matrix, the marginal peripheral edge of said block extending into the matrix a distance sufficient to form a firm mounting for the block, the matrix having opening means one each side of the block for transmission of light rays therethrough, and a seal structure around the entire outer peripheral edge of the block to provide a fluid-tight seal between the block and the matrix, said matrix exerting a compressive pressure against the seal structure.

2. A panel as defined in claim 1 and further characterized in that said seal structure comprises a flexible, resilient gasket.

3. A structural panel of a plurality of adhering layers for forming a portion of a building wall comprising at least two matrix layers of filled resinous material, a foraminous sheet at the interface of said layers, a mass of rigid cellular material encased by said layers, at least one translucent block having a thickness considerably less than the panel thickness completely surrounded by the matrix layers, the marginal peripheral edge of said block extending into the matrix layers a distance sufficient to form a firm mounting for the block, the matrix layers having opening means on each side of the block for transmission of light rays therethrough, and a seal structure around the entire outer peripheral edge of the block to provide a fluid-tight seal between the block and the matrix layers, said matrix layers exerting a compressive pressure against the seal structure.

4. A panel as defined in claim 3 and further characterized in that said seal structure comprises a flexible, resilient gasket.

5. A panel as defined in claim 3 and further characterized in the provision of a plurality of said translucent blocks, each block being spaced away from adjacent blocks and spaced from the outer periphery of the panel.

6. A panel as defined in claim 5 and further characterized in that said block is positioned entirely within said second portion.

7. A panel as defined in claim 3 and further characterized in that said translucent block is glass.

8. A structural panel of a plurality of adhering layers for forming a portion of a building wall comprising a first portion of filled resinous material, a second portion of filled resinous material, a foraminous sheet between said first and second portions, a third portion of filled resinous material, a foraminous sheet between said second and third portions, a mass of rigid cellular material encased by said portions, at least one translucent block having a thickness considerably less than the panel thickness completely surrounded by said portions, the marginal peripheral edge of said block extending into the portions a distance sufficient to form a firm mounting for the block, the portions having opening means on each side of the block for transmision of light rays therethrough, and a seal structure around the entire outer peripheral edge of the block to provide a fluid-tight seal between the block and said portions, said portions exerting a compressive pressure against the seal structure.

9. A panel as defined in claim 8 and further characterized in that said seal structure comprises a flexible, resilient gasket.

References Cited

UNITED STATES PATENTS

| | | | |
|---|---|---|---|
| 1,041,990 | 10/1912 | Freund | 52—308 |
| 2,402,717 | 6/1946 | Winter | 264—261 |
| 3,026,575 | 5/1962 | Lasher | 264—261 |
| 3,232,017 | 2/1966 | Prasinski | 52—309 |
| 3,353,220 | 11/1967 | Lenoble | 264—275 |

FOREIGN PATENTS

| | | |
|---|---|---|
| 493,009 | 1938 | Great Britain. |
| 857,064 | 1960 | Great Britain. |

HENRY C. SUTHERLAND, Primary Examiner

U.S. Cl. X.R.

52—309; 161—156, 160